(12) United States Patent
Snoop

(10) Patent No.: US 7,568,738 B1
(45) Date of Patent: Aug. 4, 2009

(54) DEVICE FOR ATTACHING A FISHING LINE TO A FLY AND/OR A HOOK

(76) Inventor: Herbert Snoop, 71 Struyk Ave., Prospect Park, NJ (US) 07508

( * ) Notice: Subject to any disclaimer, the term of this patent is extended or adjusted under 35 U.S.C. 154(b) by 0 days.

(21) Appl. No.: 12/060,638

(22) Filed: Apr. 1, 2008

(51) Int. Cl.
*D03J 3/00* (2006.01)
(52) U.S. Cl. .................................................. 289/17
(58) Field of Classification Search ................ 289/17; 43/1, 4, 42, 42.37
See application file for complete search history.

(56) References Cited

U.S. PATENT DOCUMENTS

| | | | |
|---|---|---|---|
| 2,682,126 A | 6/1954 | Shepherd | |
| 2,804,710 A | 9/1957 | Stilwell | |
| 3,606,405 A | 9/1971 | Lally | |
| 4,403,797 A | 9/1983 | Ragland, Jr. | |
| 4,573,719 A * | 3/1986 | Aldridge | 289/17 |
| 4,697,370 A | 10/1987 | Vissing | |
| 4,871,200 A * | 10/1989 | Ryder et al. | 289/17 |
| 5,197,217 A | 3/1993 | Browning | |
| 5,785,304 A * | 7/1998 | Little | 269/16 |
| 2002/0139031 A1* | 10/2002 | Ragucci | 43/1 |
| 2007/0193104 A1* | 8/2007 | Molyneux | 43/4 |

* cited by examiner

*Primary Examiner*—Shaun R Hurley
(74) *Attorney, Agent, or Firm*—Richard M. Goldberg

(57) ABSTRACT

A device for attaching a fishing line to a fly or hook of the type having a hook end and an eyelet through which a fishing line can be attached, includes a securement assembly for securely holding the hook end of the fly or hook, a guide assembly having a guide for guiding a fishing line through the eyelet of the fly or hook, and an arrangement for providing sliding and angular movement of the guide assembly relative to the securement assembly in order to enable alignment of the eyelet relative to the guide of the guide assembly.

20 Claims, 17 Drawing Sheets

DEVICE FOR ATTACHING A FISHING LINE TO A FLY AND/OR A HOOK

BACKGROUND OF THE INVENTION

The present invention relates generally to fly fishing, and more particularly, is directed to a device for attaching a fishing line to a fly and/or a hook.

When a person fly fishes, he wades out into the water and throws his line with a fly or hook at the end thereof. The fly or hook includes a hook end at one end for catching the fish and an eyelet at the opposite end through which the line is secured. A plurality of hairs or hackles are attached to the main body of the fly for hiding the hook end from the fish. However, the eyelet is very small and the fishing line is extremely thin gauge so that it is difficult for the fisherman to thread the line into the eyelet of the fly while holding onto the rod and while wading in the water, particularly in cold, windy or other inclement weather and/or in limited light.

SUMMARY OF THE INVENTION

Accordingly, it is an object of the present invention to provide a device for attaching a fishing line to the eyelet of a fly and/or hook that overcomes the aforementioned problems.

It is another object of the present invention to provide a device for attaching a fishing line to the eyelet of a fly and/or hook, which permits easy threading of the eyelet.

It is still another object of the present invention to provide a device for attaching a fishing line to the eyelet of a fly and/or hook, regardless of the weather and lighting conditions.

It is still another object of the present invention to provide a device for attaching a fishing line to the eyelet of a fly and/or hook, which lines up the eyelet with a guide for inserting a line therethrough.

It is yet another object of the present invention to provide a device for attaching a fishing line to the eyelet of a fly and/or hook, which allows a fisherman to use both hands in the threading operation.

In accordance with an aspect of the present invention, a device for attaching a fishing line to a fly or hook of the type having a hook end and an eyelet through which a fishing line can be attached, includes a securement assembly for securely holding the hook end of the fly or hook, and a guide assembly having a guide for guiding a fishing line through the eyelet of the fly or hook. There is also an arrangement for providing movement of at least one of the securement assembly and the guide assembly to provide relative movement between the securement assembly and the guide assembly in order to enable alignment of the eyelet relative to the guide of the guide assembly.

Preferably, there is a backing member, and the securement assembly and the guide assembly are secured to the backing member. The securement assembly is movably mounted along the backing plate and/or the guide assembly is movably mounted along the backing member.

The securement assembly includes a securement member, and a mounting arrangement for mounting the securement member to the backing member for movement toward and away from the backing member in order to releasably grip the hook of the fly or hook. Specifically, the backing member includes a backing plate, the securement member includes a securement plate, and the mounting arrangement includes a threaded arrangement extending between the backing plate and the securement plate for moving the securement plate toward and away from the backing plate.

The arrangement for providing movement includes a slot in one of the backing member and the guide assembly, a guide shaft secured to the other of the backing member and the guide assembly and extending through the slot for slidably movement therealong, and a tightening member engaging the guide shaft to secure the backing member and the guide assembly at a releasably fixed position relative to each other in order to enable alignment of the eyelet relative to the guide of the guide assembly. Preferably, the guide shaft includes a threaded shaft, and the tightening member includes a nut threadedly engaged on the threaded shaft. Preferably, the arrangement for providing movement permits both slidable and angular movement of at least one of the securement assembly and the guide assembly.

The guide assembly includes a guide opening for alignment with the eyelet of the hook. Specifically, the guide opening includes a beveled upper entry portion. In this regard, the guide assembly includes a nose extension with a curved cut-out portion that forms the guide opening.

In a second embodiment, the guide assembly includes first and second levers which are pivotable relative to each other, with free ends of the levers forming the nose extension with the curved cut-out portion adapted to engage around the eyelet of the hook. In such case, the guide assembly further includes a first biasing assembly for biasing the free ends of the levers apart, and a second biasing assembly for biasing the free ends of the levers toward each other. Specifically, the guide assembly includes a main body, and the levers are pivotally mounted at a mid-portion thereof to the main body. The first biasing assembly including a spring arrangement positioned against outer surfaces of opposite ends of the levers for biasing the opposite ends toward each other to thereby bias the free ends of the levers apart. The second biasing assembly includes a slidable member positioned between inner surfaces of the opposite ends of the levers for biasing the opposite ends away from each other to thereby bias the free ends of the levers toward each other. The second biasing assembly includes a threaded member threadedly engaged with the main body and contacting the slidable member to move the slidable member toward free ends of the levers.

There is also a mounting arrangement for removably mounting the device to an article of clothing of a fisherman, and the securement assembly and the guide assembly are mounted to the mounting arrangement. Preferably, the mounting arrangement includes at least two mounting members pivotally connected to each other for positioning the at least two mounting members at a desired angular relation with respect to each other, with the securement assembly and the guide assembly being mounted to a free end of one of the mounting members, and a free end of another of the mounting members includes a clothing securement arrangement for securing the device to the article of clothing of the fisherman. In one embodiment, the clothing securement arrangement includes at least two spaced apart and aligned slots at the free end for receiving a belt therethrough.

The above and other features of the invention will become readily apparent from the following detailed description thereof which is to be read in connection with the accompanying drawings.

DETAILED DESCRIPTION

Figure 1:
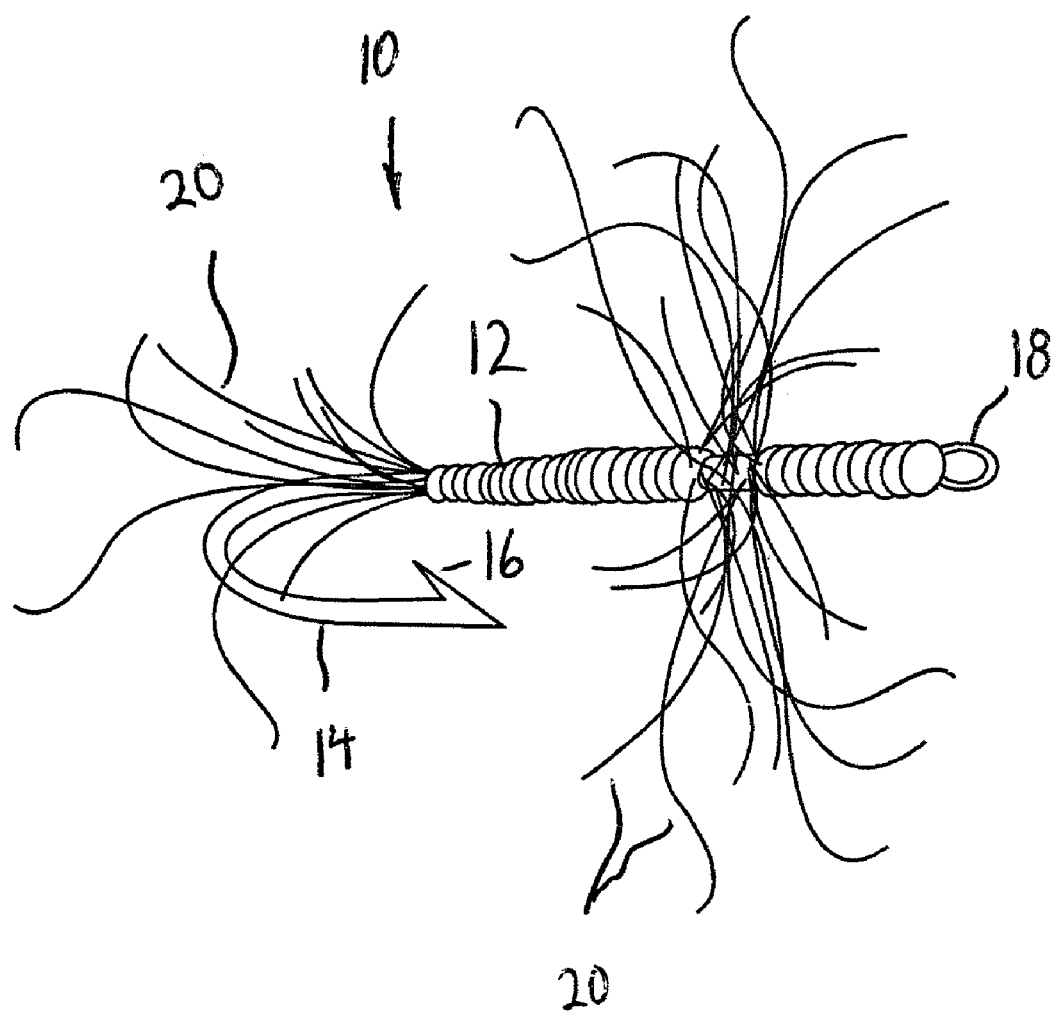
FIG. 1 is perspective view of a conventional fishing fly.
Figure 2:
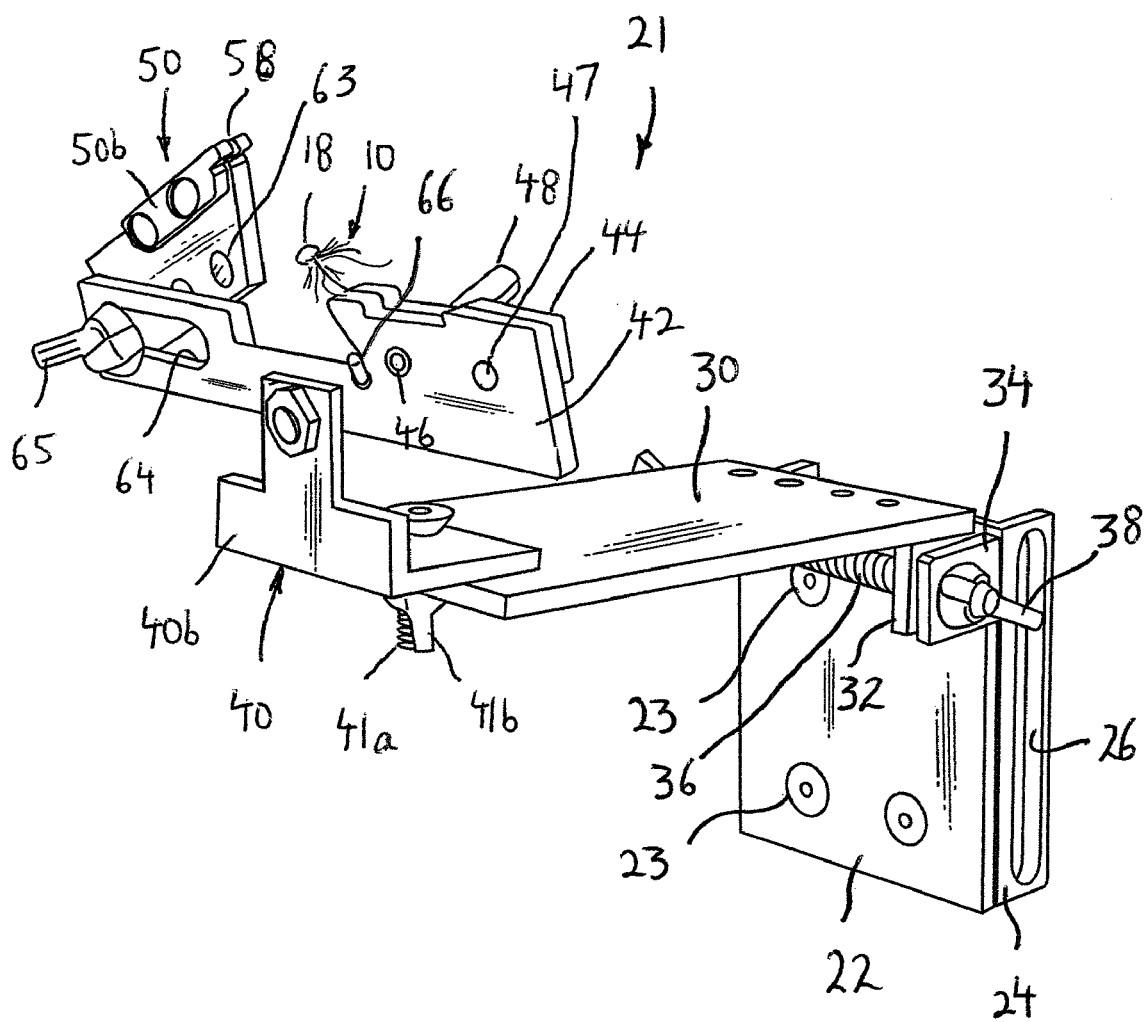
FIG. 2 is a front perspective view, viewed from the top, of a device for attaching a fishing line to the eyelet of a fly and/or hook according to the present invention in an operative condition.
Figure 3:
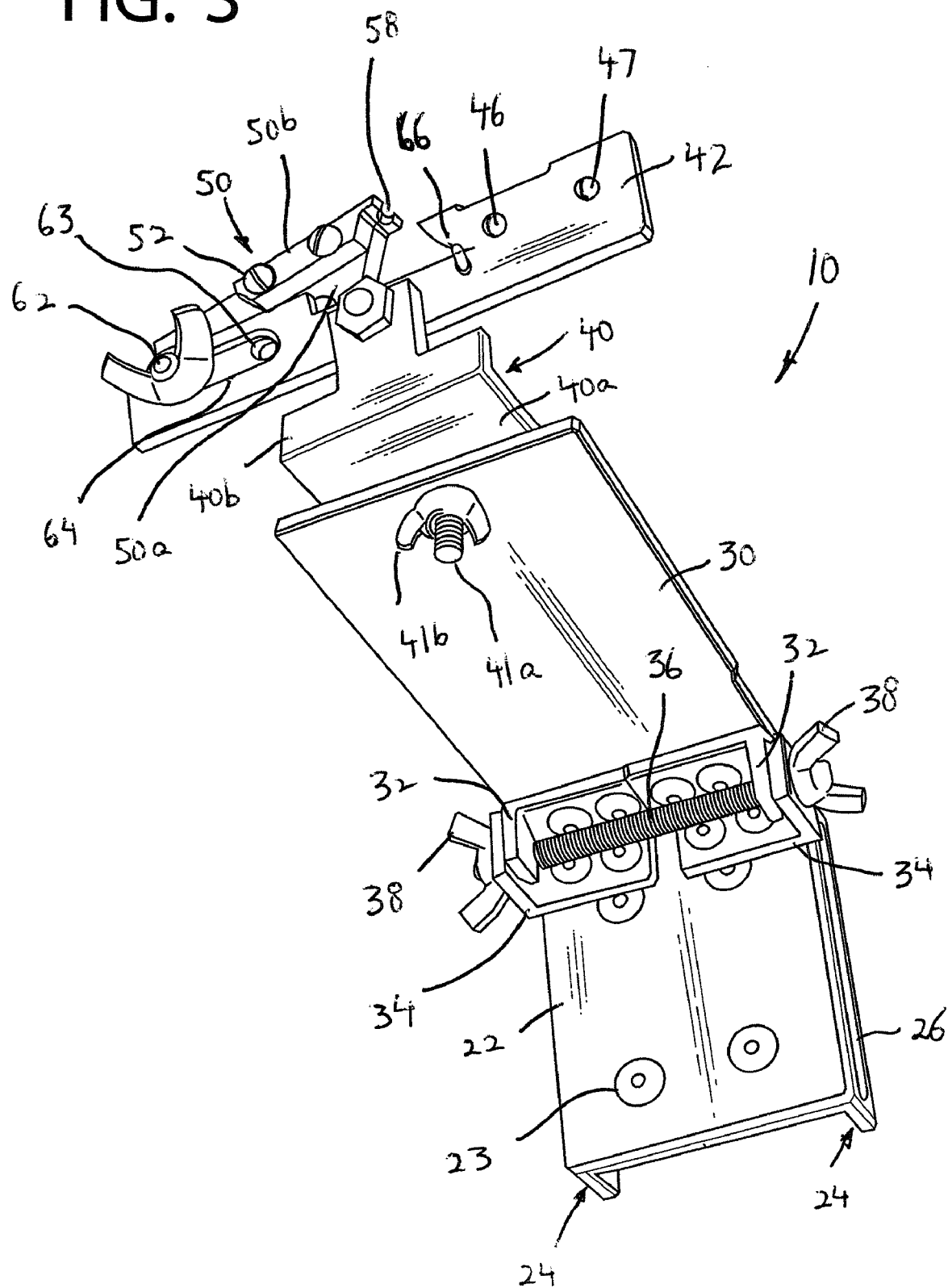
FIG. 3 is a front perspective view, viewed from the bottom, of the device of FIG. 2 in an operative condition.
Figure 4:
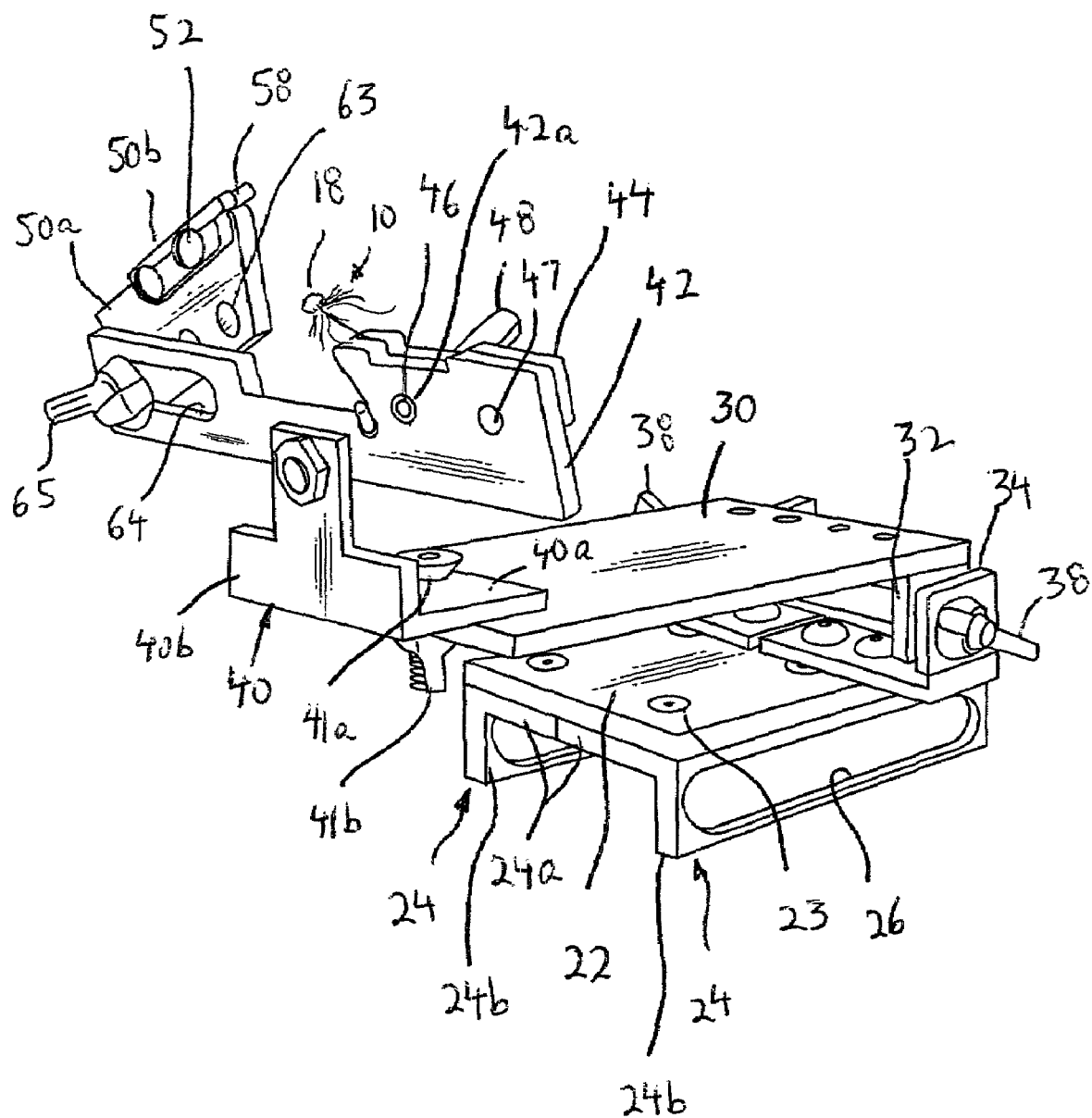
FIG. 4 is a front perspective view, viewed from the top, of the device of FIG. 2 in a folded, inoperative condition.

A standard fly 10 is shown in FIG. 1 which includes a main elongated body or shank 12 having a hook end 14 with a barb 16 at one end and a small eyelet 18 at the opposite end through which the fishing line extends and to which the fishing line is attached. A plurality of hairs or hackles 20 are attached to the main body 12 for hiding hook end 14 from the fish and for imparting a food-like appearance to the fly. Although the following embodiments are discussed in relation to a fly, it will be appreciated that the present invention is equally applicable to a hook having a hook end and an eyelet.

However, as discussed above, eyelet 18 is very small and the fishing line is extremely thin gauge, for example, between 0.001 inch to 0.125 inch so that it is difficult for the fisherman to thread the line into eyelet 18 of fly 10 while holding onto the rod and while wading in the water, particularly in cold, windy or other inclement weather and/or in limited light.

Figure 8:
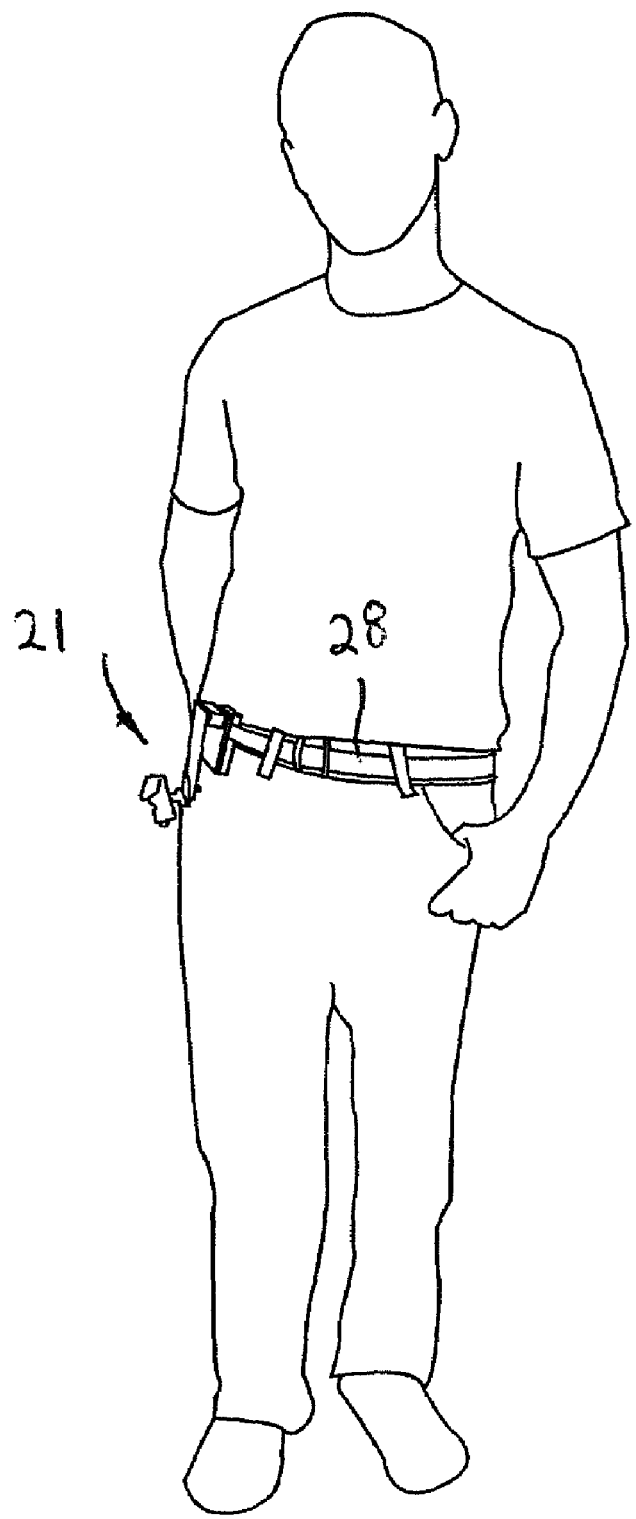
FIG. 8 is a perspective view showing the device attached to the belt of a person.

Referring now to FIGS. 2-8, a device 21 which permits easy threading of eyelet 18, regardless of the weather and lighting conditions, includes a support plate 22. Two L-shaped belt plates 24 are fixed to opposite sides of support plate 22, each having one leg plate 24a secured flush against support plate 22 by rivets 23 and a second leg plate 24b, with leg plates 24b extending rearwardly in parallel, spaced apart relation at opposite sides of support plate 22. Each leg plate 24b has an elongated opening 26 therein for receiving a person's belt 28 (FIG. 8). Of course, other attachment arrangements can be provided, for example, clips and the like which clip onto the wading vest of the fisherman. Further, belt 28 can be a belt of a conventional type that wraps around a person's upper torso for holding a wader worn by the fisherman in order to prevent water from entering. Belt 28 can even be wrapped around a person's upper torso where there is no wader.

An extension plate 30 is connected to the upper end of support plate 22, and extends forwardly of support plate 22. Specifically, extension plate 30 includes two ears 32 secured to an underside thereof at opposite sides of extension plate 30 and at one end thereof. Support plate 22 includes two ears 34 extending rearwardly from opposite sides thereof and near the upper end of support plate 22. A threaded shaft 36 extends through openings (not shown) in ears 32 and 34, and wing nuts 38 are threadedly engaged on opposite ends of shaft 36 for securing the assembly together. In this manner, extension plate 30 is pivotally mounted with respect to support plate 22 and can be tightened by wing nuts 38 at a desired angular position. It will be appreciated that, while the above arrangement provides for pivoting of extension plate 30 about support plate 22 in an angular range of 180°, it is also possible to provide for extension plate 30 to pivot 360° with respect to support plate 22, by merely relocating ears 34 at the upper edge of support plate 22 and the ears 32 at the rear end surface of extension plate 30.

Figure 5:
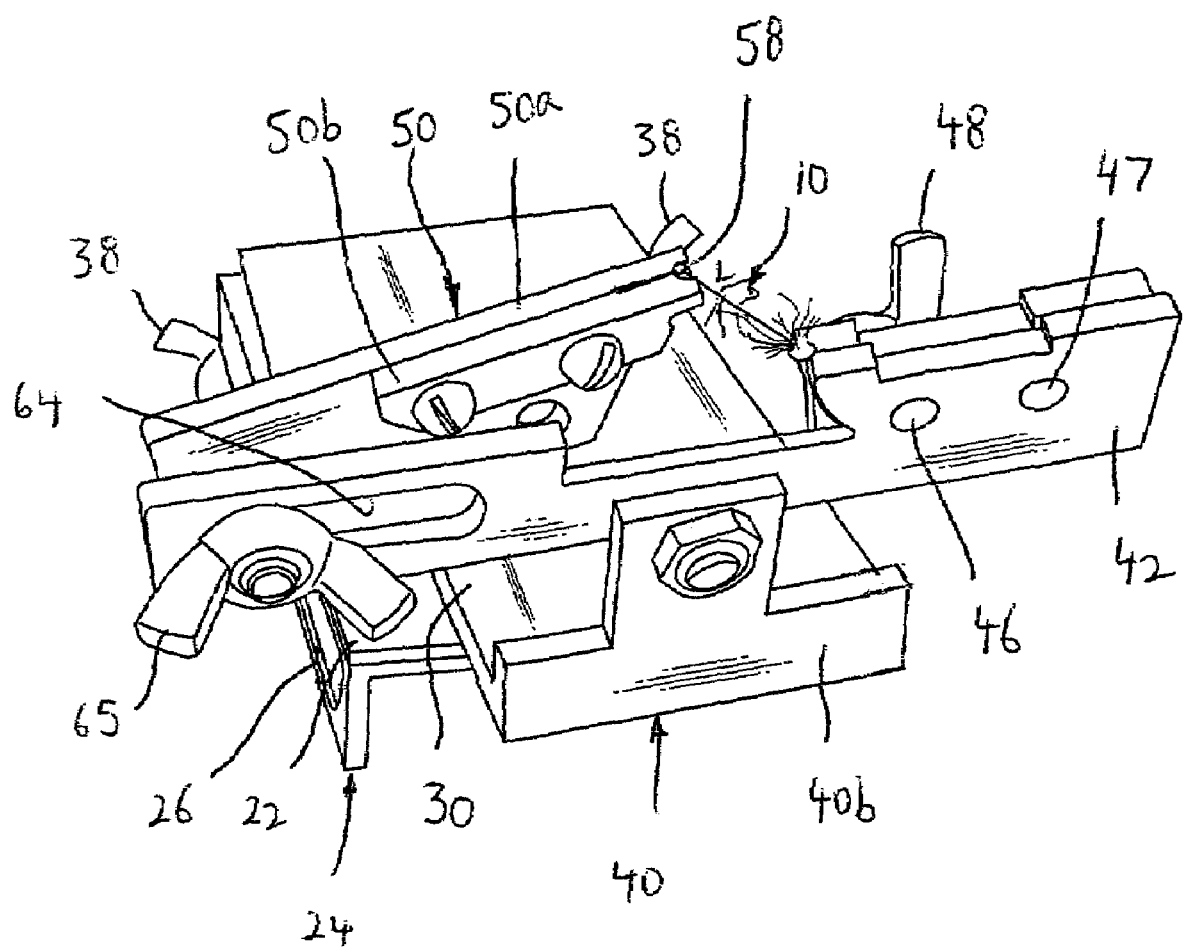
FIG. 5 is an enlarged front perspective view of the line guiding attachment.
Figure 6:
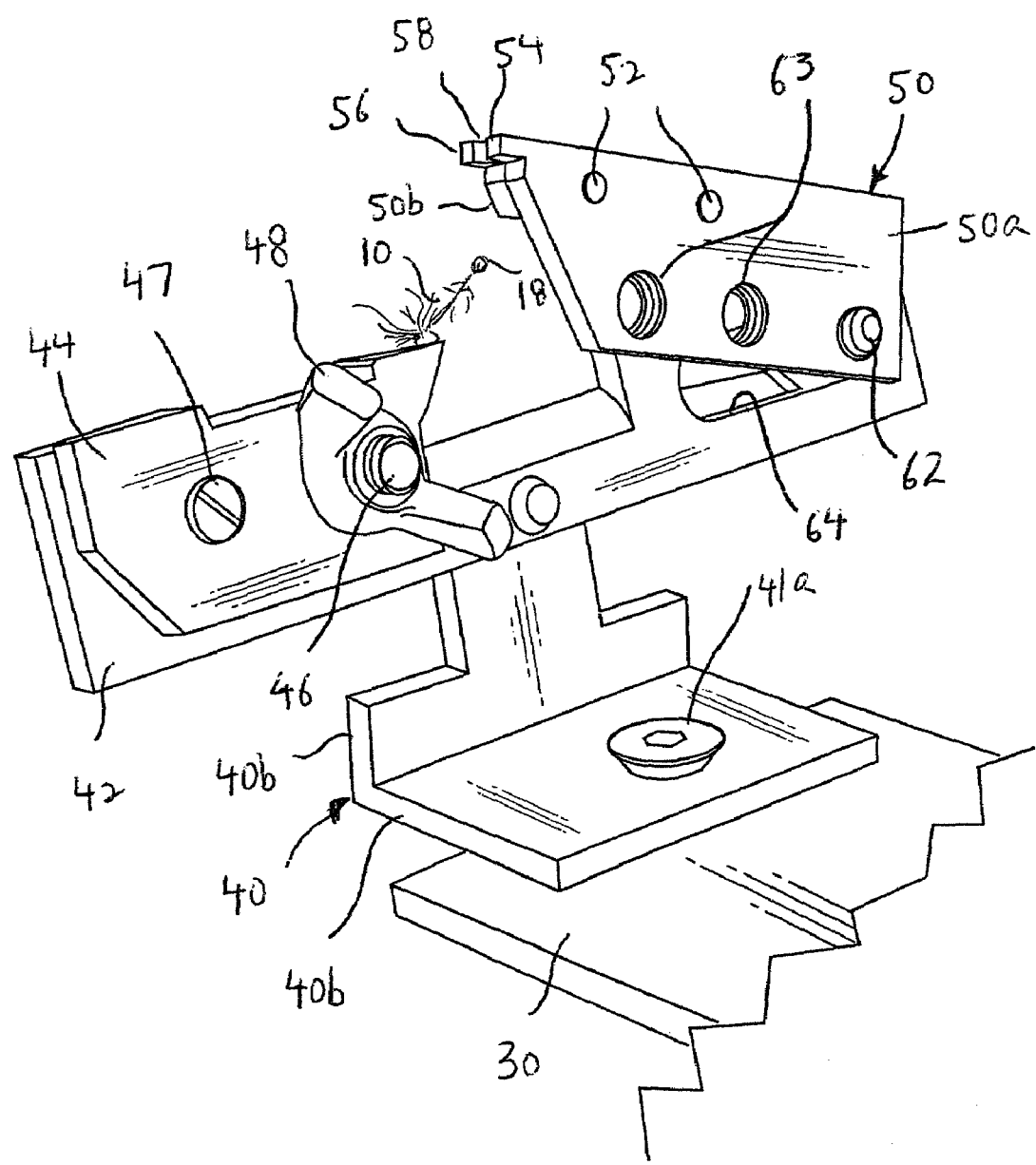
FIG. 6 is an enlarged rear perspective view of the line guiding attachment.

An L-shaped mounting plate 40 is removably mounted to the free end of extension plate 30 by a bolt 41a and wing nut 41b extending through one leg plate 40a of plate 40, with the other leg plate 40b having a T-shape and extending upwardly in a direction opposite from support plate 22. A modification is shown in FIG. 5 in which L-shaped mounting plate 40 is formed as a unitary, one-piece structure with extension plate 30.

The essence of the invention is the structure connected to the upper end of leg plate 40b of L-shaped plate 40. Specifically, an elongated fly mounting backing plate 42 is secured to the upper end of leg plate 40b of L-shaped plate 40, preferably at a mid-position therealong, although the present invention is not limited thereby. A securement plate 44 is removably secured flush against fly mounting backing plate 42 at an upper portion thereof by a bolt or threaded shaft 46 and a wing nut 48 for finger tightening or loosening the same. A bolt or guide shaft 47 also extends through adjacent openings of plates 42 and 44 to prevent rotation of securement plate 44 relative to fly mounting backing plate 42. Threaded shaft 46 extends through an opening (not shown) in securement plate 44 and is threadedly received in a threaded opening 42a in elongated fly mounting backing plate 42. In this manner, when wing nut 48 is loosened, securement plate 44 can be moved away from elongated fly mounting backing plate 42. In this manner, hook end 14 of fly 10 can be positioned between securement plate 44 and elongated fly mounting backing plate 42, whereupon wing nut 48 can be tightened to draw securement plate 44 and elongated fly mounting backing plate 42 toward each other in order to tightly secure hook end 14 therebetween. Accordingly, hook end 14 of fly 10 can be removably captured between plates 42 and 44 to hold the same in position in such a manner that eyelet 16 thereof extends upwardly at an angle therefrom.

A guide plate assembly 50 is formed by a primary guide plate 50a and a supplemental guide plate 50b, the latter being mounted flush at the upper end of primary guide plate 50a by bolts 52 or the like. However, it will be appreciated that guide plate assembly 50 can be a single-piece, unitary construction. As shown best in FIG. 7, primary guide plate 50a includes a first nose extension 54, and supplemental plate 50b includes a second nose extension 56 positioned adjacent to first nose extension 54. Nose extensions 54 and 56 are cut away along the center line 55 where they meet to define a semi-circular or semi-oval cut-out portion 58. Further, the upper entry portion 60 of such semi-circular cut-out portion 58 is beveled to provide a guide-in for a fishing line into semi-circular cut-out portion 58.

Figure 7:
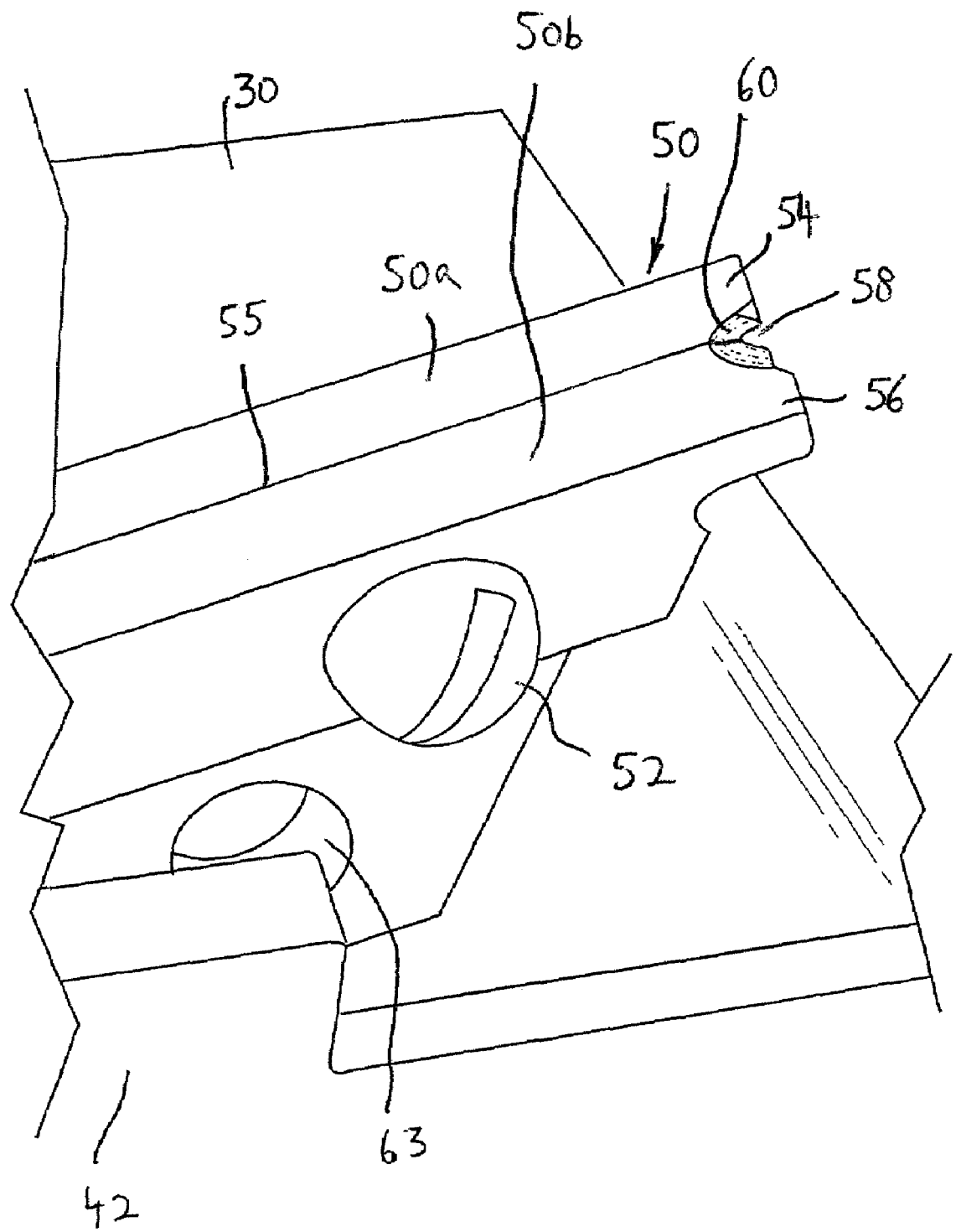
FIG. 7 is an enlarged perspective view of the semi-oval cut-out portion of the line guiding attachment.
Figure 7A:
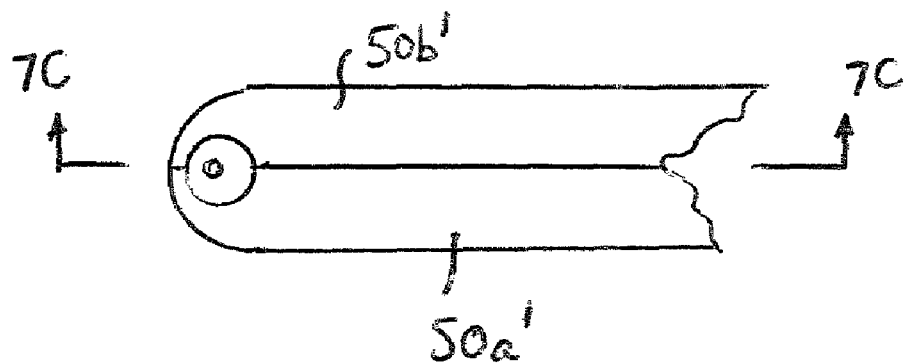
FIG. 7A is a top plan view of a modified guide plate assembly according to the present invention in an assembled condition.
Figure 7B:
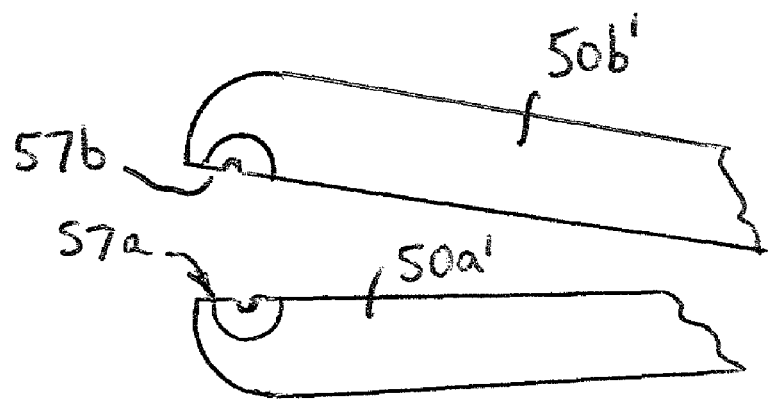
FIG. 7B is a top plan view of the modified guide plate assembly of FIG. 7A in an exploded view.
Figure 7C:
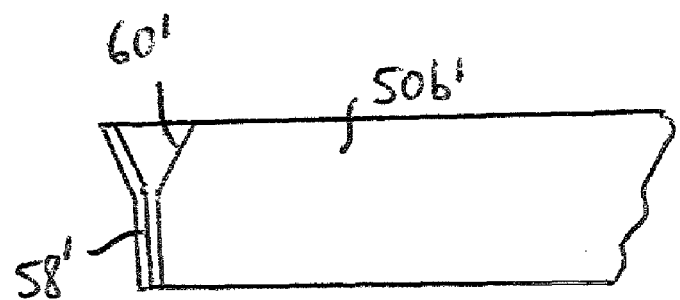
FIG. 7C is a side elevational view of one guide plate of the modified guide plate assembly of FIG. 7A, taken along line 7C-7C thereof.

Alternatively, as shown in FIGS. 7A-7C, the guide plate assembly can be formed from a primary guide plate 50a' and a supplemental guide plate 50b', which have semi-circular openings 57a and 57b, respectively, and when assembled together, form a funnel-shaped or bevel shaped upper entry portion 60' that leads into a smaller through bore 58' through which a fishing line extends to be secured to eyelet 18.

A bolt or threaded shaft 62 is threadedly received in one of three threaded openings 63 in primary guide plate 50a and also extends through an elongated slot 64 in elongated fly mounting backing plate 42, with a wing nut 65 secured on the free end of threaded shaft 62. Accordingly, primary guide plate 50a can slid along and rotated in elongated slot 64 to be positioned at a desired position and angle relative to elongated fly mounting backing plate 42. In this manner, guide plate assembly 50 can be selectively secured by a user at a desired position and angle relative to elongated fly mounting backing plate 42 such that semi-circular cut-out portion 58 is positioned immediately above eyelet 16 of fly 10, the hook end 14 of which is held between plates 42 and 44.

As such, with the device secured to a belt or vest of the fisherman, it is only necessary for the fisherman to thread the very thin fishing line through semi-circular opening 58 which, because of beveled upper entry portion 60 therein, forces the line centrally therein and through eyelet 16, where it can then be tied to eyelet 16. Thereafter, wing nut 48 is loosened in order to separate plates 42 and 44 and remove fly 10, which has the line secured thereto. It will be appreciated that a fisherman can use both hands to perform this operation since device 10 is secured to the fisherman's belt or garment.

The above process is repeated for the threading of each fly 10, which makes it easy to perform such a threading operation with both hands when the fisherman has waded out into the water. The operation can be performed in hot weather, cold weather, windy conditions, low light, etc. It will be appreciated that the device need not attach to a belt or clothing, but can also be used independently.

In addition, an LED light 66 or the like can be secured to elongated fly mounting backing plate 42 or any other structure thereof, and be actuated by a push button (not shown) also on elongated fly mounting backing plate 42 to light up the area in order for the fisherman to better view the threading operation. A small battery (not shown) can be provided for energizing LED light 66.

Figure 9:
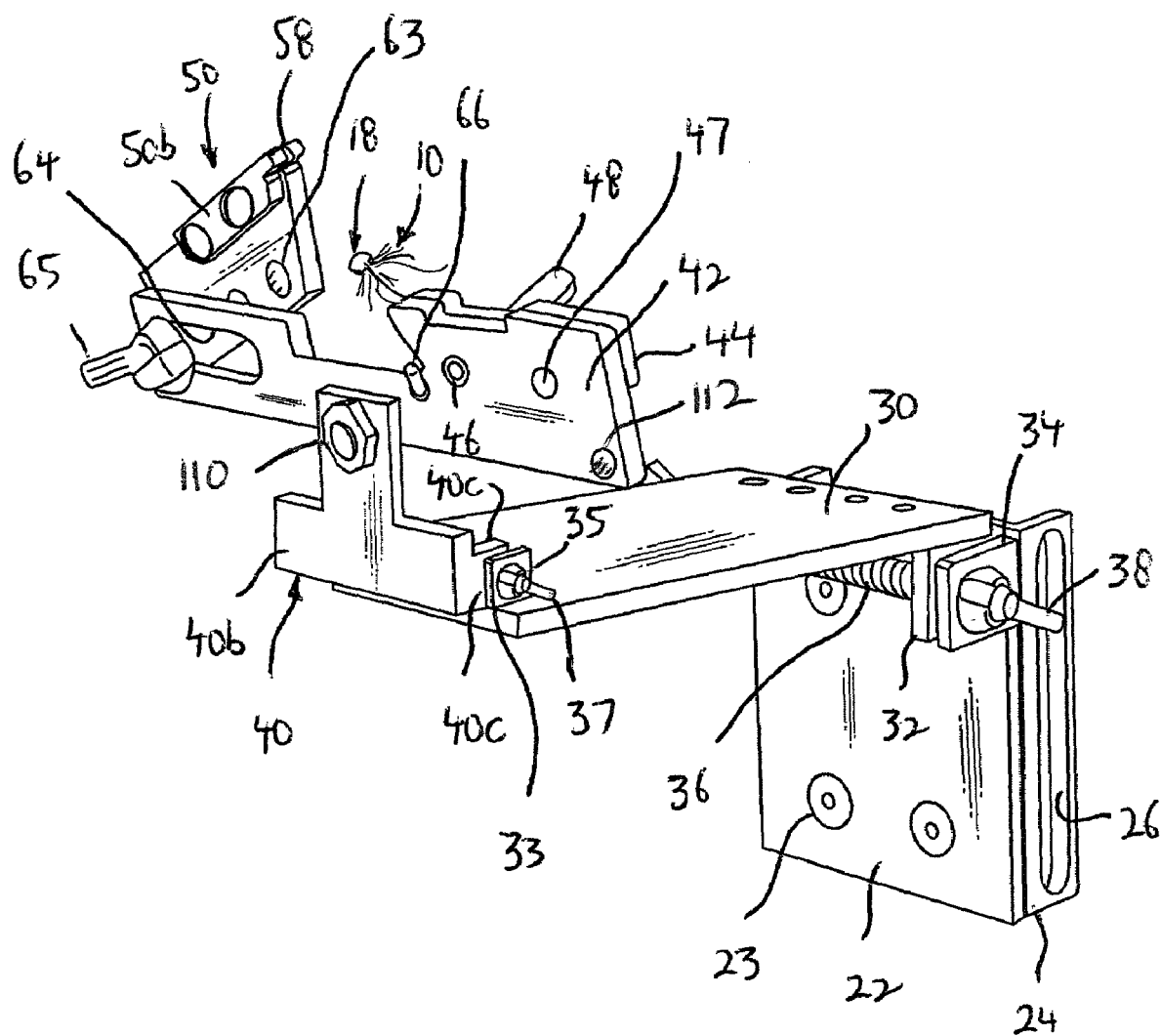
FIG. 9 is a perspective view of a modified device for attaching a fishing line to the eyelet of a fly and/or hook according to the present invention.

It will be appreciated that mounting plate 40 can also be pivotally mounted to the free end of extension plate 30, as shown by the modification in FIG. 9. Specifically, leg plate 40a is replaced by ears 40c on opposite ends of leg plate 40b. Extension plate 30 includes two ears 33 extending from opposite sides and flush against ears 40c. A threaded shaft 35 extends through openings (not shown) in ears 33 and 40c, and wing nuts 37 are threadedly engaged on opposite ends of shaft 35 for securing the assembly together. In this manner, mounting plate 40 is pivotally mounted with respect to extension plate 30 and can be tightened by wing nuts 37 at a desired angular position. It will be appreciated that, while the above arrangement provides for pivoting of mounting plate 40 about extension plate 30 in an angular range of 180°, it is also possible to provide for mounting plate 40 to pivot 360° with respect to extension plate 30 by merely relocating ears 33, 40c. This arrangement also provides the advantage that plates 22, 30 and 40b can be arranged in parallel, superposed relation to each other for compact storage and shipping.

Referring now to FIGS. 10-16, there is shown a guide plate assembly 70 according to a second embodiment of the present invention. Specifically, while guide plate assembly 50 is intended to be oriented so that semi-circular cut-out portion 58 is positioned immediately above eyelet 16 of fly 10, guide plate assembly 70 is intended to capture eyelet 16 therein for a guiding operation.

Specifically, guide plate assembly 70 includes a primary guide plate 72 with three openings 74 therein for receiving threaded shaft 62 therein to adjustably secure primary guide plate 72 at a desired sliding position and angle relative to elongated fly mounting backing plate 42. Primary guide plate 72 is wider at an upper portion 72a thereof. A rear plate 76 is secured by bolts 78 or the like to a rear face 72b of primary guide plate 72. Two levers 80 are mounted on the upper surface of primary guide plate 72 for pivoting movement in a clothes-pin like arrangement. Specifically, a pivot pin 82 extends down through each lever 80 at a central portion thereof into the upper surface of primary guide plate 72 so as to pivotally secure each lever 80 thereto for movement in a lateral direction thereof.

Each lever 80 tapers in thickness from a position adjacent the respective pivot pin 82 toward a rear end thereof adjacent rear plate 76, with inner surface portions 80a of each lever 80 thereat forming a wedge shaped arrangement. Forwardly of pivot pin 82, the inner surface portions 80b are cut away slightly and are in parallel, spaced apart relation in the closed configuration of guide plate assembly 70. The forward ends of levers 80 are cut away to define a semi-circular or semi-oval cut-out portion 84. Further, the upper entry portion 86 of such semi-circular or semi-oval cut-out portion 84 is beveled to provide a guide-in for a fishing line into cut-out portion 84.

Figure 10:
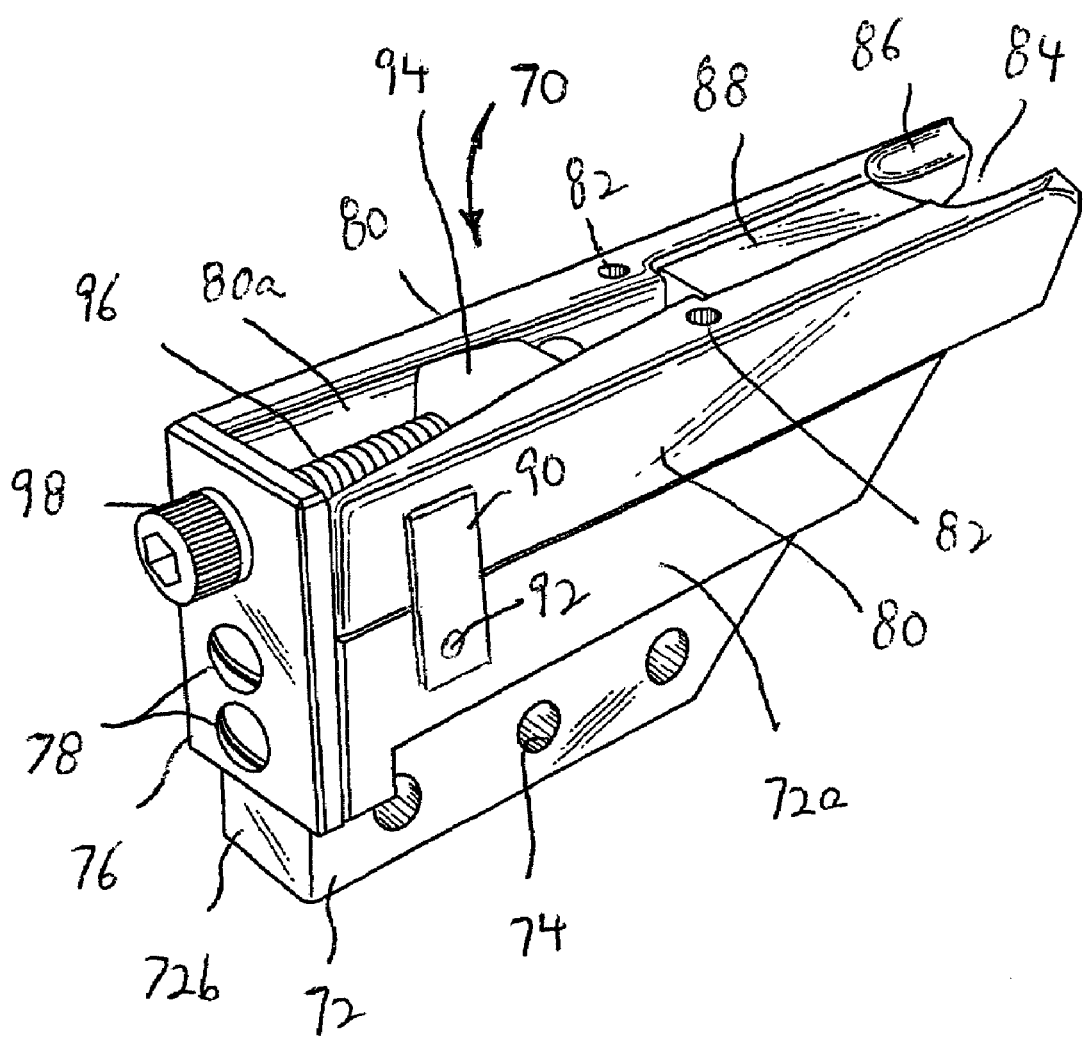
FIG. 10 is a perspective view of a line guiding attachment according to another embodiment of the present invention, in a first position.
Figure 11:
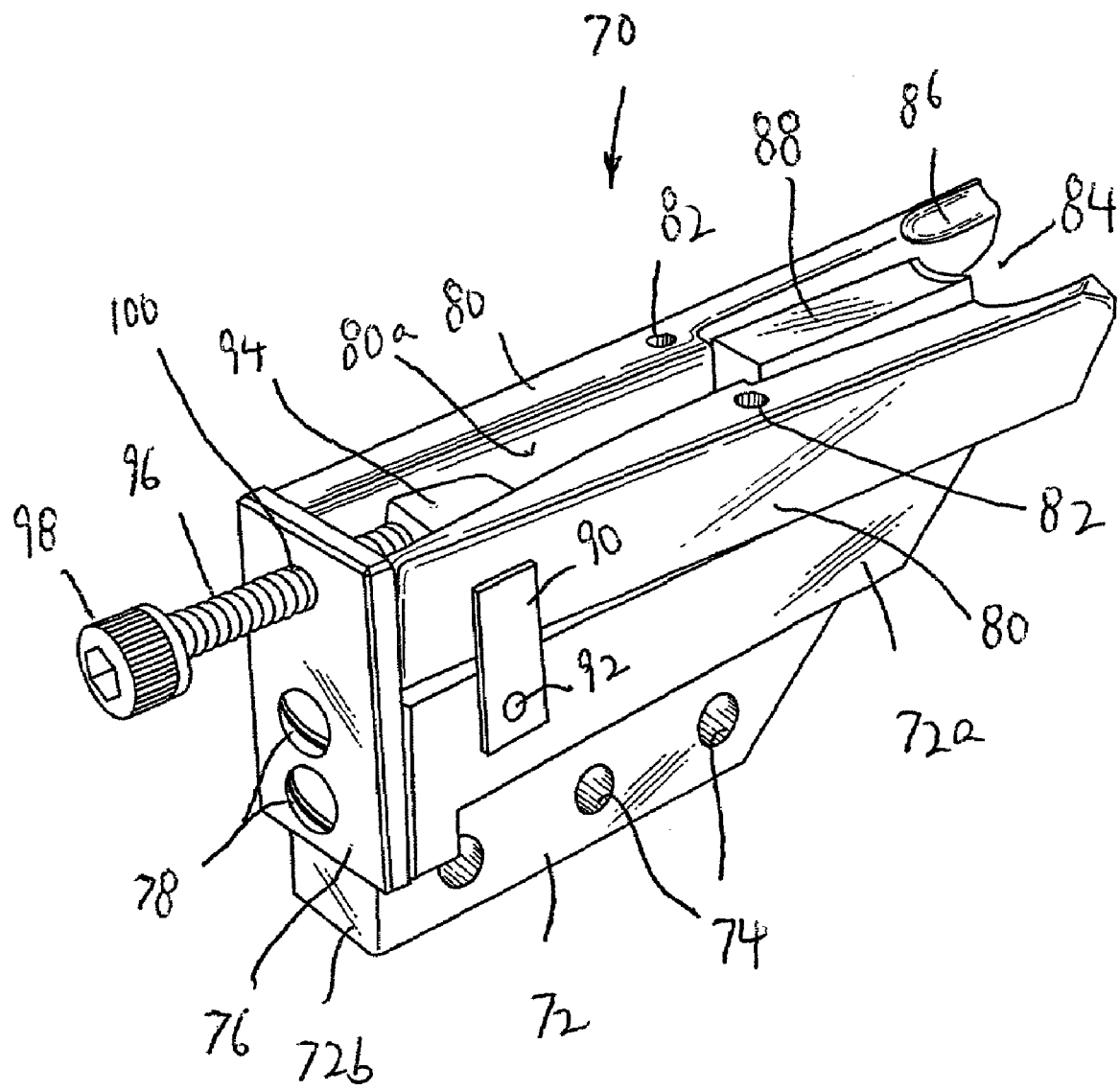
FIG. 11 is a perspective view of the line guiding attachment of FIG. 10, in a second position.
Figure 12:
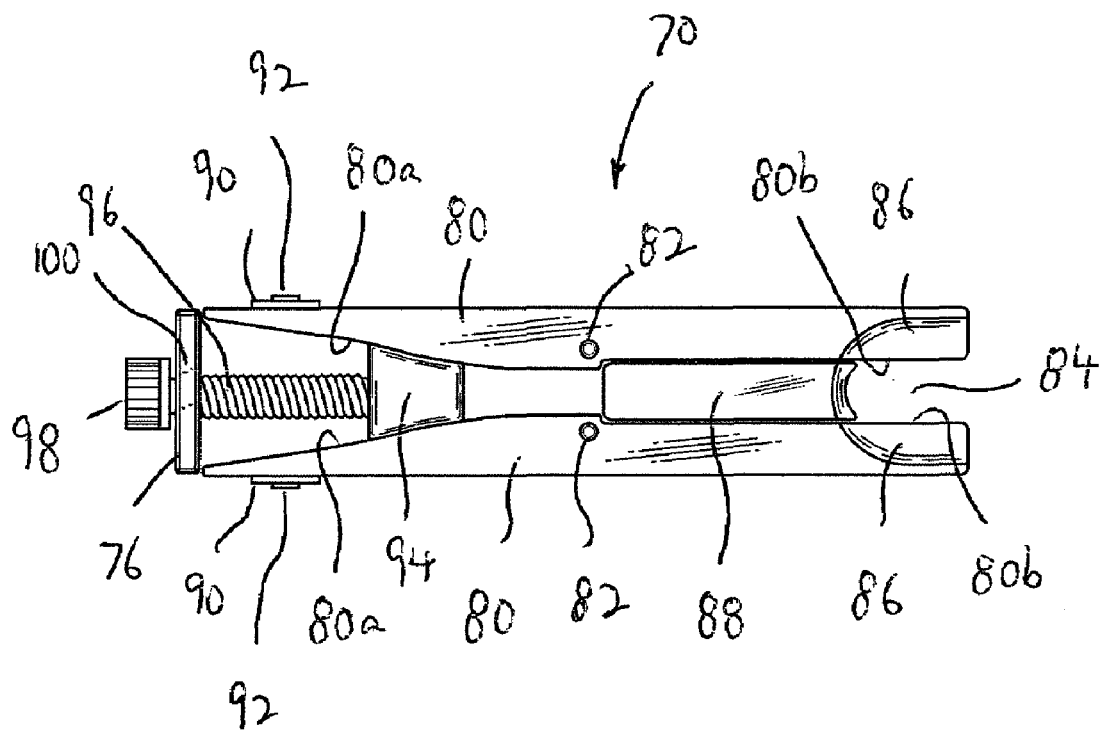
FIG. 12 is a top plan view of the line guiding attachment of FIG. 10.
Figure 13:
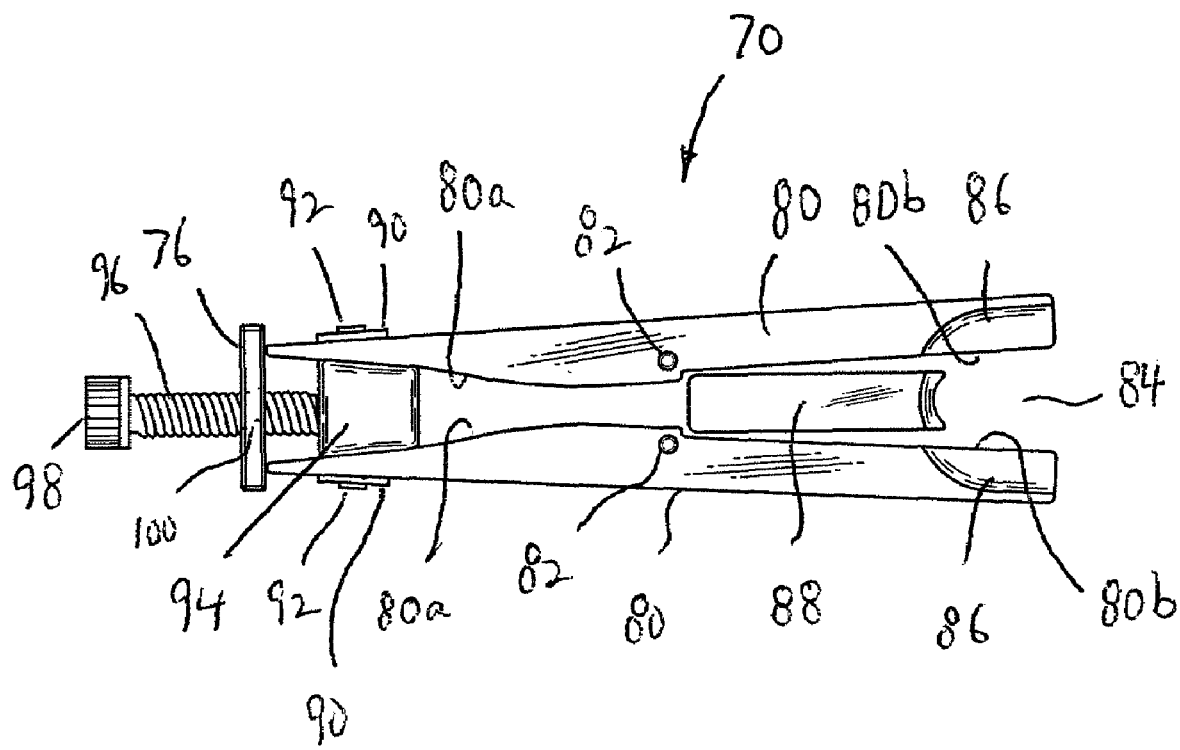
FIG. 13 is a top plan view of the line guiding attachment of FIG. 11.
Figure 14:
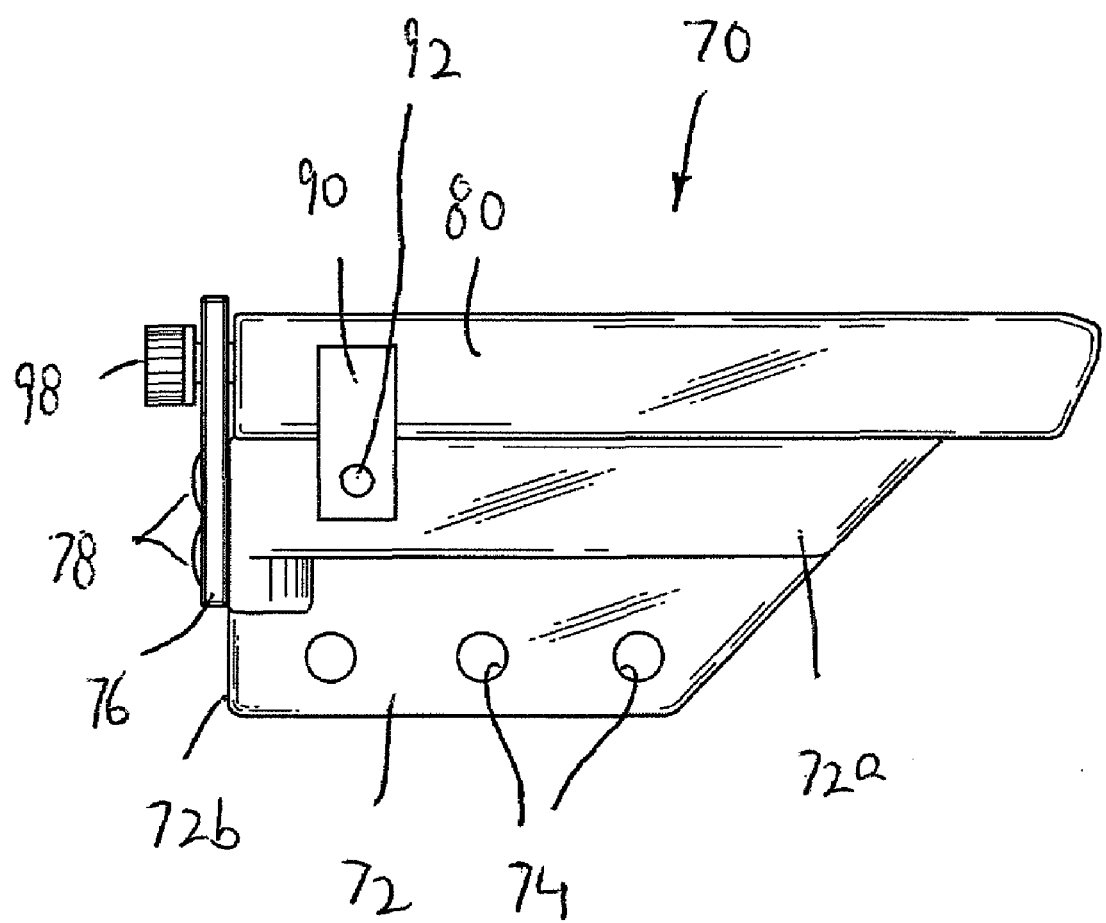
FIG. 14 is a left side elevational view of the line guiding attachment of FIG. 10.
Figure 15:
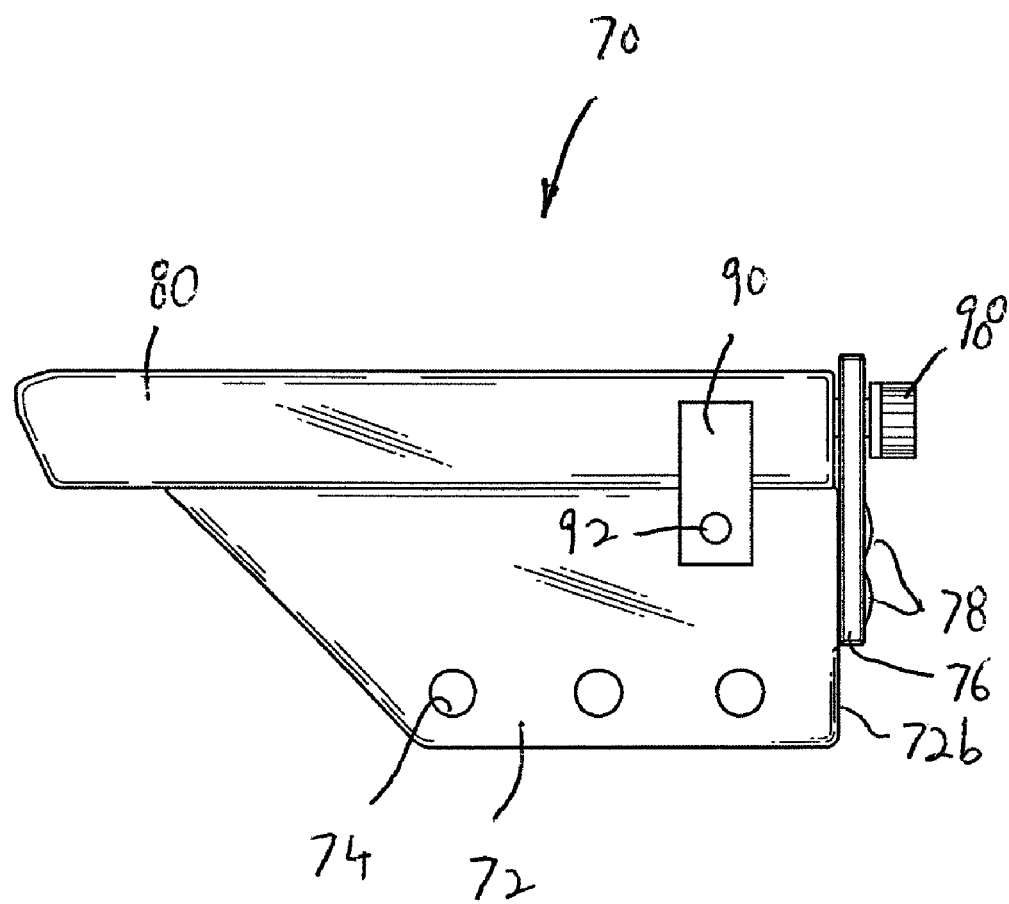
FIG. 15 is a right side elevational view of the line guiding attachment of FIG. 10.
Figure 16:
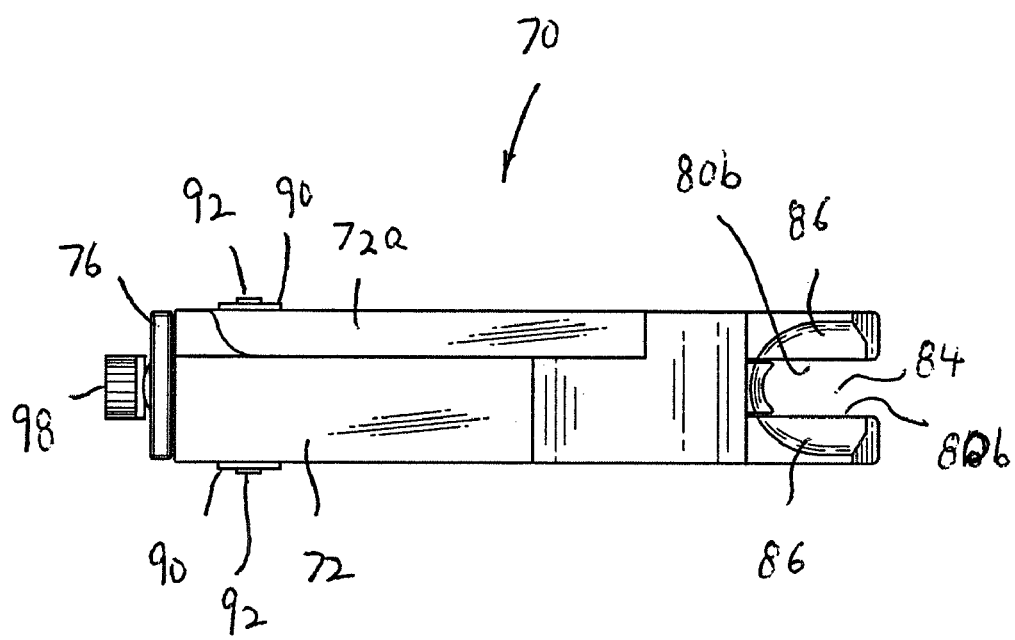
FIG. 16 is a bottom plan view of the line guiding attachment of FIG. 10.

A rectangular parallelepiped shaped block 88 is mounted on top of primary guide plate 72 and functions as a stop to limit the closing pivoting movement of levers 80. In the closed, operative position, inner surface portions 80b can abut against side edges of block 88, as shown in FIGS. 10 and 12.

Leaf springs 90 are fixed by rivets 92 to outer side faces of widened upper portion 72a of primary guide plate 72 and extend into contact with the outer surfaces of levers 80 at the rear ends thereof. This functions to bias the rear ends of levers 80 together, and thereby bias inner surface portions 80b apart in order to increase the diameter of semi-circular or semi-oval cut-out portion 84.

A trapezoidal parallelepiped wedge 94 is positioned for sliding movement on the upper surface of primary guide plate 72, between inner surface portions 80a of levers 80. A threaded bolt 96 having an enlarged head 98 is threadedly engaged in a threaded opening 100 of rear plate 76, with the free end of threaded bolt 96 abutting against wedge 94. Preferably, the free end of threaded bolt 96 can be freely rotatably secured to wedge 94 in any suitable manner, so that wedge 84 moves linearly with threaded bolt 96.

Figure 17:
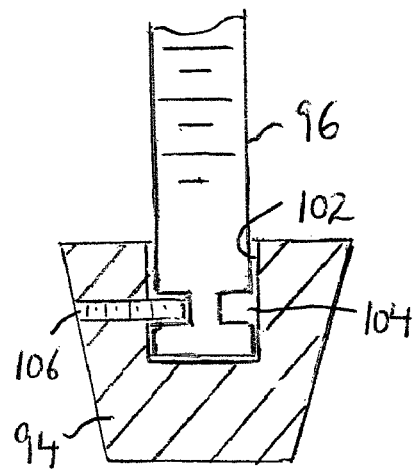
FIG. 17 is a cross-sectional view showing rotatable securement of the threaded bolt to the wedge.

For example, as shown in FIG. 17, wedge 94 has a cylindrical bore 102 in the rear face thereof through which the free end of threaded bolt 96 extends. The free end of threaded bolt 96 is cut-away at a positioned spaced forwardly of the free end thereof to define a circumferential recess 104. A set screw 106 extends through a side face of wedge 94 and is engaged within recess 104, thereby restraining bolt 96 from escaping from bore 102, while also permitting rotation of bolt 96 within bore 102.

In this manner, as bolt 96 is turned, it moves forwardly or rearwardly in rear plate 76. As a result, wedge 94 is moved forwardly or rearwardly of guide plate assembly 70. As it is moved forwardly, it functions to move inner surface portions 80a apart, and thereby move inner surface portions 80b toward each other, thereby reducing the diameter of semi-circular or semi-oval cut-out portion 84. As it is moved rearwardly, leaf springs 90 function to move inner surface portions 80a together, whereby wedge 94 is moved rearwardly with threaded bolt 96, and thereby moving inner surface portions 80b away from each other, thereby increasing the diameter of semi-circular or semi-oval cut-out portion 84.

It will be appreciated that various modifications can be made to the present invention. For example, a clamp that clamps the hook end 16 can be slidably mounted in elongated fly mounting back plate 42 in place of securement plate 44 in the same sliding manner as with guide plate assembly 50.

As another alternative, as shown in FIG. 9, the nut and bolt arrangement 110 that connects L-shaped mounting plate 40 to elongated fly mounting back plate 42 can be removed, so that device 21 can be used without using L-shaped mounting plate 40, extension plate 30 or support plate 22 to attach device 21 to clothing of a fisherman. In such case, a lanyard (not shown) can be secured in opening 112 of elongated fly mounting back plate 42 to attach device 21 to clothing of a fisherman.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A device for attaching a fishing line to a fly or hook of the type having a hook end and an eyelet through which a fishing line can be attached, said device comprising:
   a securement assembly for securely holding the hook end of the fly or hook;
   a guide assembly having a guide for guiding a fishing line in a first direction through the eyelet of the fly or hook, the guide including an open portion that permits escape of said fishing line from said guide in a second direction substantially transverse to said first direction; and
   an arrangement for providing movement of at least one of said securement assembly and said guide assembly to provide relative movement between the securement assembly and the guide assembly in order to enable alignment of the eyelet relative to the guide of the guide assembly.

2. A device according to claim 1, further comprising a backing member, and said securement assembly and said guide assembly are secured to said backing member.

3. A device according to claim 2, wherein said securement assembly is movably mounted along said backing plate.

4. A device according to claim 3, wherein said guide assembly is movably mounted along said backing member.

5. A device according to claim 2, wherein said guide assembly is movably mounted along said backing member.

6. A device according to claim 2, wherein said securement assembly includes:
   a securement member, and
   a mounting arrangement for mounting said securement member to said backing member for movement toward and away from said backing member in order to releasably grip the hook end of the fly or hook.

7. A device according to claim 6, wherein:
   said backing member includes a backing plate,
   said securement member includes a securement plate, and
   said mounting arrangement includes a threaded arrangement extending between said backing plate and said securement plate for moving said securement plate toward and away from said backing plate.

8. A device according to claim 2, wherein said arrangement for providing movement includes:
   a slot in one of said backing member and said guide assembly,
   a guide shaft secured to the other of said backing member and said guide assembly and extending through said slot for slidably movement therealong, and
   a tightening member engaging said guide shaft to secure said backing member and said guide assembly at a releasably fixed position relative to each other in order to enable alignment of the eyelet relative to the guide of the guide assembly.

9. A device according to claim 8, wherein said guide shaft includes a threaded shaft, and said tightening member includes a nut threadedly engaged on said threaded shaft.

10. A device according to claim 1, wherein said arrangement for providing movement permits both slidable and angular movement of at least one of said securement assembly and said guide assembly.

11. A device according to claim 1, wherein said guide assembly includes a guide opening for alignment with the eyelet of the fly or hook.

12. A device according to claim 11, wherein said guide opening includes a beveled upper entry portion.

13. A device according to claim 11, wherein said guide assembly includes a nose extension with a curved cut-out portion that forms said guide opening.

14. A device according to claim 13, wherein said guide assembly includes first and second levers which are pivotable relative to each other, with free ends of said levers forming said nose extension with said curved cut-out portion adapted to engage around the eyelet of the fly or hook.

15. A device according to claim 14, wherein said guide assembly further includes:
   a first biasing assembly for biasing said free ends of said levers apart, and
   a second biasing assembly for biasing said free ends of said levers toward each other.

16. A device according to claim 15, wherein:
   said guide assembly includes a main body,
   said levers are pivotally mounted at a mid-portion thereof to said main body,
   said first biasing assembly including a spring arrangement positioned against outer surfaces of opposite ends of the levers for biasing said opposite ends toward each other to thereby bias said free ends of said levers apart, and
   said second biasing assembly includes a slidable member positioned between inner surfaces of the opposite ends of the levers for biasing said opposite ends away from each other to thereby bias said free ends of said levers toward each other.

17. A device according to claim 16, wherein said second biasing assembly includes a threaded member threadedly engaged with said main body and contacting said slidable member to move said slidable member toward free ends of said levers.

18. A device according to claim 1, further comprising a mounting arrangement for removably mounting the device to an article of clothing of a fisherman, and said securement assembly and said guide assembly are mounted to said mounting arrangement.

19. A device according to claim 18, wherein said mounting arrangement includes at least two mounting members pivotally connected to each other for positioning said at least two mounting members at a desired angular relation with respect to each other, with said securement assembly and said guide assembly being mounted to a free end of one of said mounting members, and a free end of another of said mounting members includes a clothing securement arrangement for securing the device to the article of clothing of the fisherman.

20. A device according to claim 19, wherein said clothing securement arrangement includes at least two spaced apart and aligned slots at said free end for receiving a belt therethrough.

* * * * *